United States Patent
Borwig

(10) Patent No.: US 8,561,448 B2
(45) Date of Patent: Oct. 22, 2013

(54) DUCT BLANK SEAM AND APPARATUS FOR MAKING A DUCT BLANK SEAM

(75) Inventor: Michael C. Borwig, Swisher, IA (US)

(73) Assignee: Mestek Machinery, Inc., Westfield, MA (US)

( * ) Notice: Subject to any disclaimer, the term of this patent is extended or adjusted under 35 U.S.C. 154(b) by 667 days.

(21) Appl. No.: 12/511,125

(22) Filed: Jul. 29, 2009

(65) Prior Publication Data

US 2010/0077822 A1 Apr. 1, 2010

Related U.S. Application Data

(63) Continuation-in-part of application No. 12/243,489, filed on Oct. 1, 2008, now Pat. No. 8,276,425.

(51) Int. Cl.
*B21D 11/00* (2006.01)

(52) U.S. Cl.
USPC .......... 72/306; 72/319; 72/129; 138/157; 138/163

(58) Field of Classification Search
USPC ........ 72/131, 307, 387, 404, 405.1, 306, 130, 72/176–182, 129, 319; 285/424; 138/157, 138/163
See application file for complete search history.

(56) References Cited

U.S. PATENT DOCUMENTS

| | | | | |
|---|---|---|---|---|
| 2,076,228 A * | 4/1937 | Dressing | | 72/48 |
| 3,296,911 A * | 1/1967 | McLane | | 83/408 |
| 3,479,073 A * | 11/1969 | Collins | | 52/506.1 |
| 3,654,830 A | 4/1972 | Werner, Jr. | | |
| 3,726,120 A | 4/1973 | Hugert | | |
| 4,045,989 A | 9/1977 | Ryan | | |
| 4,112,986 A * | 9/1978 | Strange et al. | | 144/356 |
| 4,466,641 A | 8/1984 | Heilman et al. | | |
| 5,105,640 A * | 4/1992 | Moore | | 72/51 |
| 5,189,784 A | 3/1993 | Welty | | |
| 5,243,750 A | 9/1993 | Welty | | |
| 5,328,540 A * | 7/1994 | Clayton et al. | | 156/285 |
| 6,311,534 B1 | 11/2001 | Shah et al. | | |
| 6,746,534 B2 | 6/2004 | Borwig | | |
| 6,981,398 B2 | 1/2006 | Toben et al. | | |
| 7,296,455 B2 * | 11/2007 | Durney | | 72/306 |
| 7,681,297 B2 * | 3/2010 | Toben et al. | | 29/521 |

* cited by examiner

*Primary Examiner* — Dana Ross
*Assistant Examiner* — Homer Boyer
(74) *Attorney, Agent, or Firm* — McCormick, Paulding & Huber LLP

(57) ABSTRACT

A flanged duct blank has a male part defined by lead notches formed at each side of a leading end and has a female part defined by trail notches formed at each side of a trailing end. The male part includes a lock tab. The female part includes a leg part and a Z-bend. The Z-bend includes a leg part and a gap. The duct blank is repeatedly clamped and bent by a pivoting wiper to form a duct portion. The pivoting wiper includes a clench tool that has a retractable rib and a retractable roller. With the lock tab inserted into the Z-bend and the retractable rib engaged with the Z-bend, the retractable roller clenches the leg part over the lock tab to lock the male and female parts together in a duct seam.

8 Claims, 5 Drawing Sheets

DUCT BLANK SEAM AND APPARATUS FOR MAKING A DUCT BLANK SEAM

CROSS REFERENCE TO RELATED APPLICATIONS

This application is a continuation-in-part of, claims priority to, and hereby incorporates herein by reference in its entirety, U.S. patent application Ser. No. 12/243,489, filed on Oct. 1, 2008.

FIELD OF THE INVENTION

The present invention relates generally to ventilation ducts, and more particularly, to methods and apparatus for making ventilation ducts.

BACKGROUND OF THE INVENTION

With known apparatus for manufacturing ventilation ducts and the like, a series of bends are made in a metal web to form a duct blank. The duct blank then is closed by one or more seams extending the length of the duct blank. The seams can be folded or welded shut.

A seam can be pre-formed by bending and aligning free edges of the partially formed duct. However, known seams must be clamped, backstopped, or otherwise supported from an inner surface of the duct blank in order to properly apply the forces required for adequate closure. Such clamping is not easily provided in-line with apparatus for bending the duct blank. Thus, the duct blank typically is removed from the bending apparatus to another work station for final closure of the seam. Removal of the duct blank to the other work station requires extra steps for handling and aligning the duct blank in the other work station. These extra steps reduce the efficiency of production.

Once the duct blank is removed from the bending apparatus, the seam can be closed by repeatedly banging a hammer against the free edge of the seam. However, the repeated impacts of the hammer are noisy and tend to deform the metal along the seam. Alternatively, Welty (U.S. Pat. No. 5,189,784 hereby incorporated herein by reference in its entirety) discloses an apparatus for forming and closing seams in box-shaped ducts. However, Welty's apparatus is not adapted for use in-line with other machinery. In particular, manual handling is required to properly position a duct blank relative to Welty's clamps and rollers. Thus, Welty's apparatus, although a significant advance in the art of its day, fails to optimize efficiency of production.

SUMMARY OF THE INVENTION

In view of the unsolved problems posed by the prior art, it is a general object of the present invention to provide a lock seam structure that permits in-line forming and finishing of a duct blank seam to provide an ease of manufacture not achieved with present duct structures. Another object of the present invention is to provide a lock seam structure that permits in-line closure and finishing of a duct blank having edge flanges. Another object is to provide a lock seam structure that permits in-line finishing by clenching together male and female portions of a duct blank seam.

In one embodiment, the present invention comprises a duct blank formed from a sheet of bendable material, the duct blank having a body with flanges formed along side edges thereof, and with a male portion and a female portion formed at opposed ends thereof, the male and female portions being shaped to be fitted together in a seam to close the duct blank, and the flanges being notched to permit bending the duct blank so as to form the seam.

In another embodiment, the present invention comprises a plurality of similar duct blanks disposed along a continuous coil or web of sheet metal, the duct blanks being demarked by paired lead and trail notches formed at side edges of the metal sheet web, the same lead and trail notches also defining the male and female portions of each duct blank.

These and other advantages of the present invention will be better understood in view of the Drawings and description of a preferred embodiment.

DETAILED DESCRIPTION OF A PREFERRED EMBODIMENT

Figure 1:
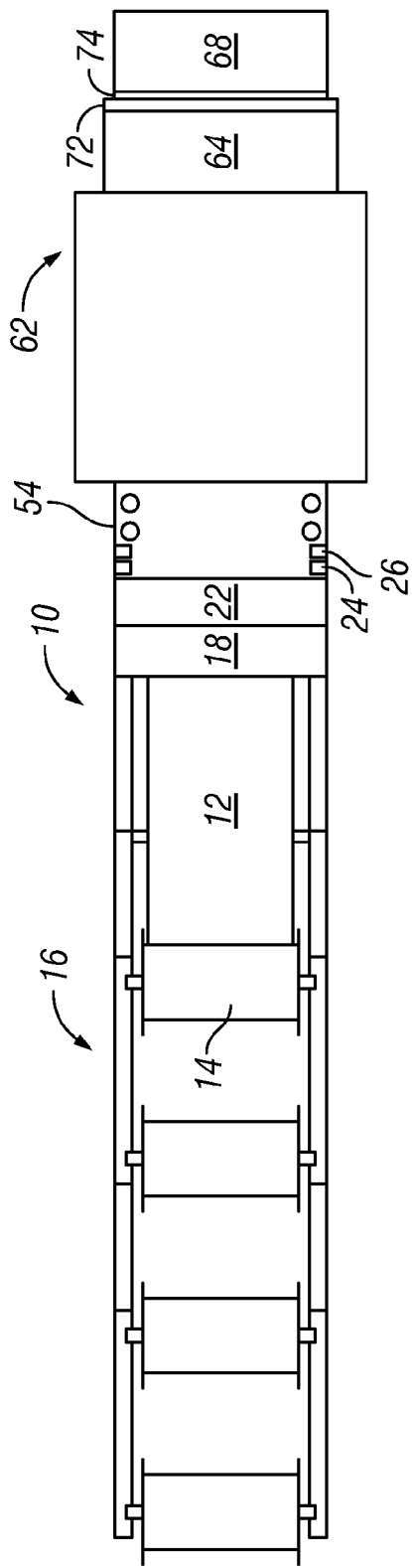
FIG. 1 is a top or plan view of a schematic diagram illustrating a line of equipment including an apparatus for forming a box-shaped duct according to the principles of the invention.
Figure 2:
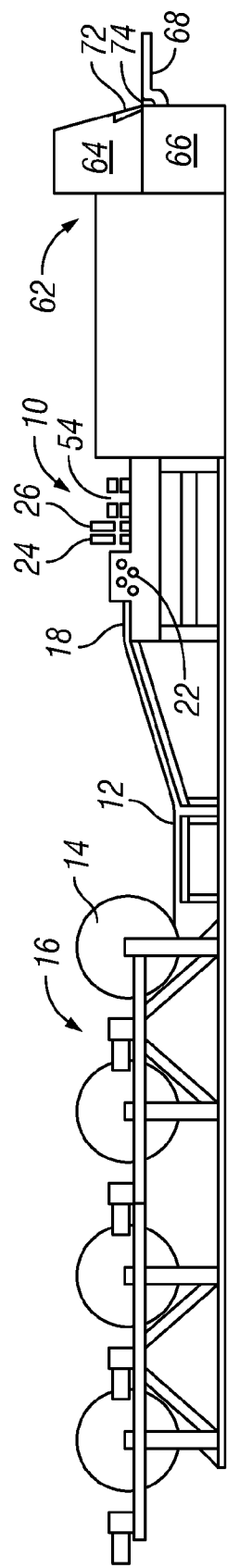
FIG. 2 is is a side elevational view schematically showing the line of equipment for carrying out the method of the invention.

Referring to FIGS. 1 and 2, an apparatus 10 produces box-shaped duct sections from a metal sheet 12, or other bendable material, of the desired gauge and width. As is well known to those skilled in the art, the width of the metal sheet determines the length of the completed duct section.

The metal sheet is commonly supplied on a large roll or coil 14, which is placed in an uncoiler 16 at one end of the apparatus. The metal sheet is fed by a feeder 18 from the uncoiler into a straightener 22 containing a plurality of rolls for removing the set in the metal sheet caused by it being wound on a coil.

After the straightener, the metal sheet passes along a midline of the apparatus to main notchers 24 and intermediate notchers 26.

Figure 3:
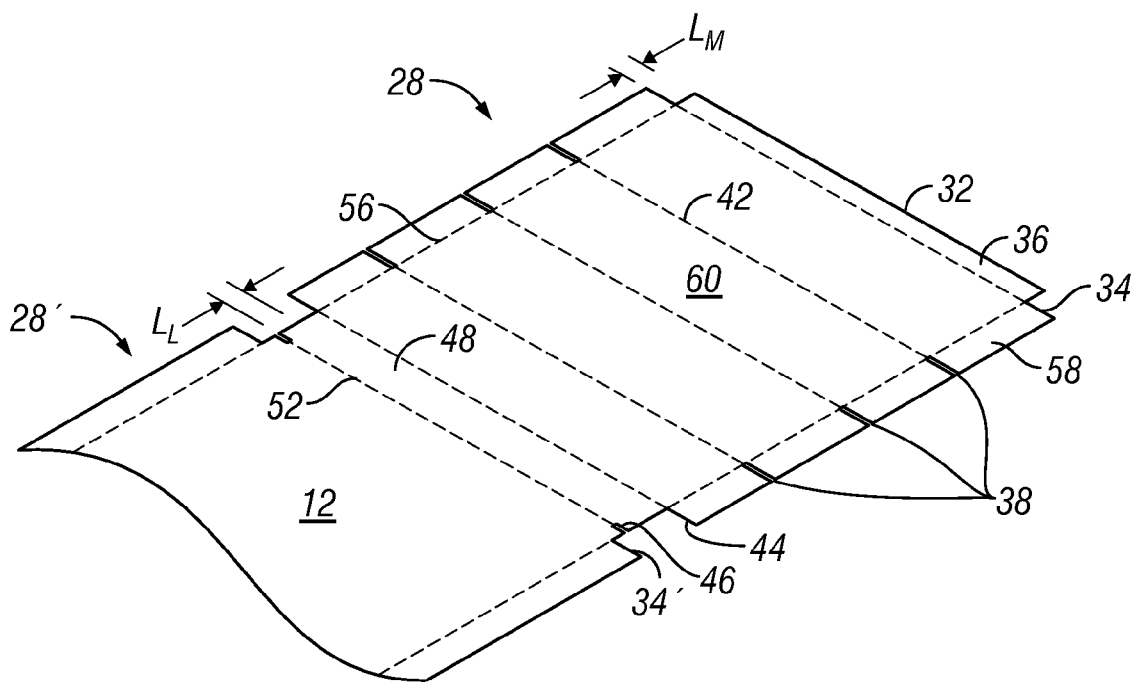
FIG. 3 is a perspective view of a duct blank formed in a metal sheet with male and female portions at leading and trailing ends and joined at the trailing end to a similar duct blank.

The notchers are controlled to notch the side edges of the metal sheet at predetermined distances to define a duct blank 28 that will ultimately be bent to form the box-shaped duct section. In other words, the distance between the notches will correspond to the dimensions of the finished duct section. Referring to FIG. 3, at a leading end 32 of the metal sheet, the main notchers form opposed lead notches 34 in the side edges, defining a male portion 36 of the duct blank. As the metal sheet passes the intermediate notchers, opposed pairs of intermediate notches 38 are formed at intervals along the side edges to define fold lines 42. After the last pair of intermediate notches, the main notchers form opposed pairs of trail notches 44, slots 46 extending partially inward across the metal sheet, and a second opposed pair of lead notches 34'. The trail notches define a female portion 48 of the duct blank. The slots define a trailing end 52 of the duct blank. The second pair of lead notches define a male portion 36' of a trailing duct blank 28'.

Figure 4:
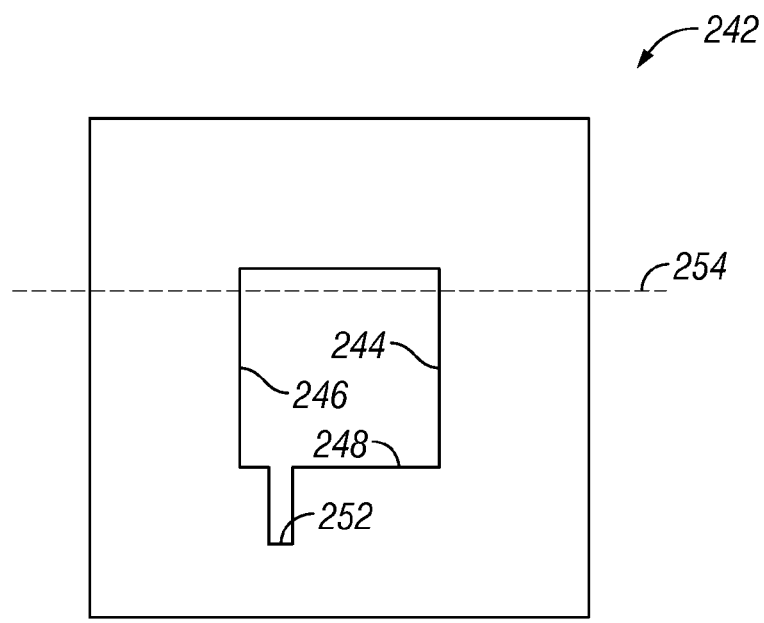
FIG. 4 is a plan view of a main notcher die used in forming the male and female portions of the duct blank shown in FIG. 3.
Figure 5:
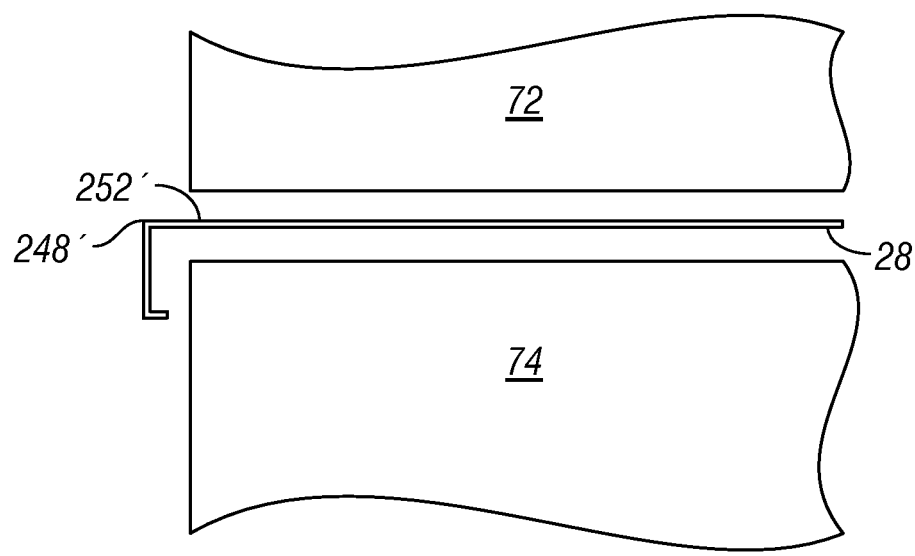
FIG. 5 is an end view of the metal sheet with marked locations corresponding to dimensions of the main notcher die shown in FIG. 4.

Referring to FIGS. 4 and 5, each of the main notchers includes a die 242 and a matching punch (not shown). The die opening has a leading face 244, a trailing face 246, an inward face 248, and a slot 252. In use, the metal sheet is fed across the die so that a side edge of the metal sheet is in registration with a guideline 254. Operation of each main notcher punch and die produces the lead and trail notches at the corresponding side edge of the metal sheet, defining inward notch edges 248' and slot ends 252'.

Once the metal sheet has been notched to form the duct blank, the side edges are bent downwardly by a roll former 54 (shown in FIGS. 1 and 2), along side lines 56 defined by the inward notch edges, to form flanges 58 extending substantially perpendicular to a main part 60 of the duct blank. The flanges are later used to connect individual box-shaped duct sections, as is well known to those skilled in the art. It will be understood that the principles of the invention are applicable to forming box-shaped duct sections regardless of whether these flanges are formed or not.

Figure 6:
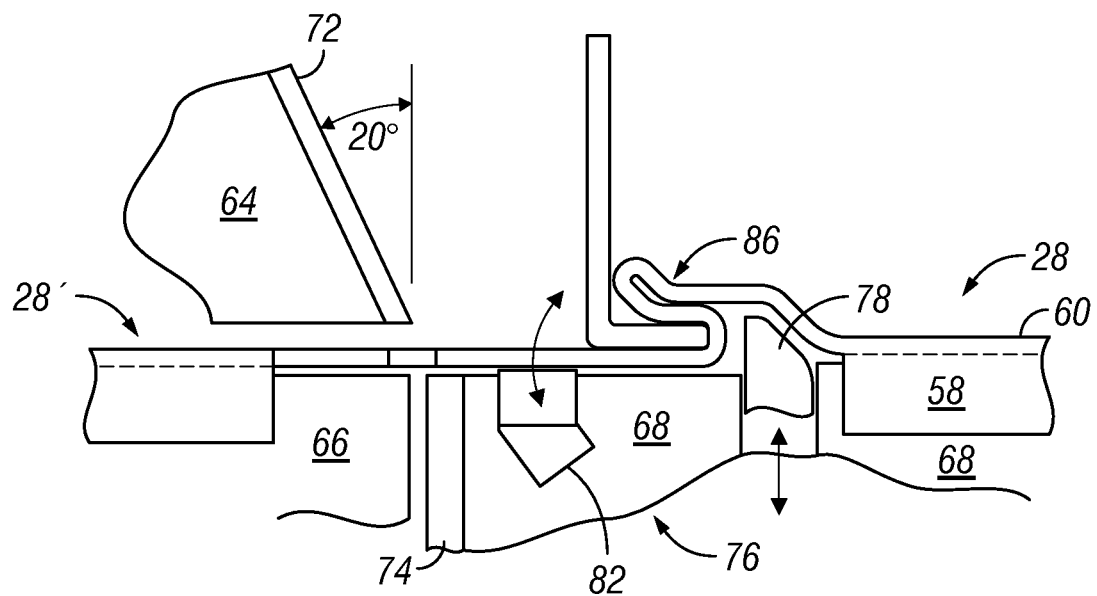
FIG. 6 is an end view of the duct blank of FIG. 3, bent to insert the male portion into the female portion and held by a clench tool portion of the forming apparatus of FIGS. 1 and 2, with the trailing end aligned to shear blades.
Figure 7:
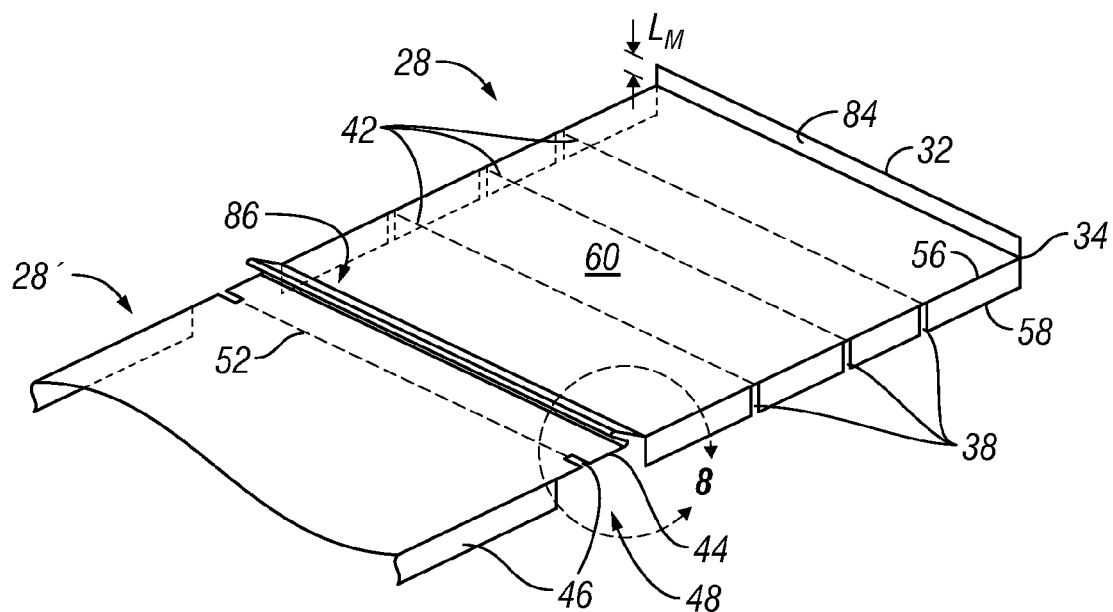
FIG. 7 is a perspective view of the duct blank of FIG. 3, bent to form flanges, a lock tab, and a Z-bend, and of a trailing duct blank.

Referring back to FIGS. 1 and 2, the duct blank is then fed into a forming apparatus 62. The forming apparatus and its operation are described more fully in co-pending U.S. patent application Ser. No. 12/243,489, hereby incorporated herein by reference in its entirety. As discussed therein, the forming apparatus includes a clamp beam 64, a bed assembly 66, and a wiper 68, as shown in FIG. 6. The wiper and the clamp beam together provide a vertically opposed pair of upper and lower shear blades 72, 74. The wiper includes a clench tool 76 for closing a seam formed in the duct blank, as further described in detail below.

Referring to FIG. 6, the clench tool includes a retractable rib 78 extending across the width of the wiper, and also includes a retractable roller assembly 82 disposed between the retractable rib and the shear blade of the wiper. The retractable roller assembly is movable across the wiper substantially parallel to the retractable rib.

Referring to FIGS. 7 through 11, in the forming apparatus, the duct blank is repeatedly folded at the lead and trail notches so that the duct blank male portion is bent substantially perpendicular to the duct blank main part to form a lock tab 84, and so that the duct blank female portion is folded to form a Z-bend 86, an offset part 88, and a leg part extending from the Z-bend to the duct blank trailing end. The lock tab protrudes from the main part to a length $L_M$. The leg part extends a length $L_L$ between the duct blank trailing end and the Z-bend. The length $L_L$ exceeds the length $L_M$.

Figure 8:
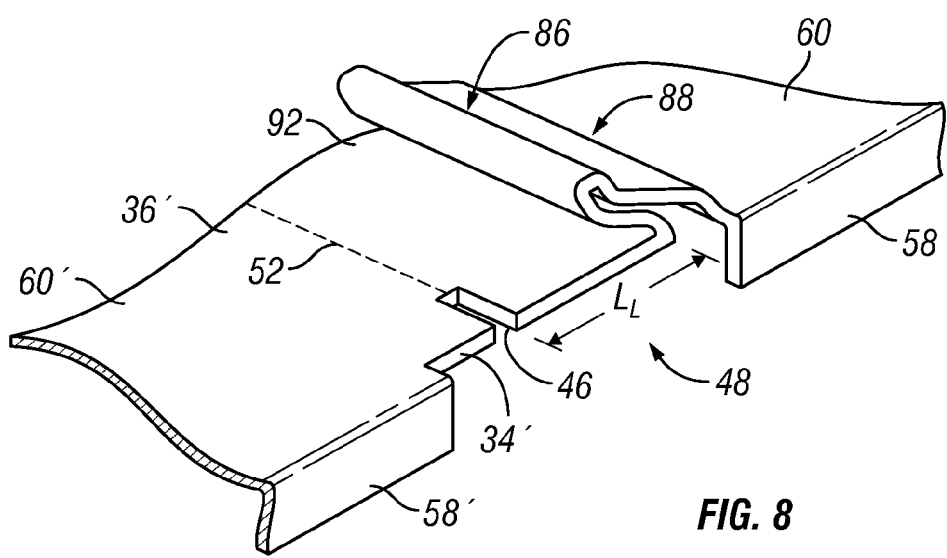
FIG. 8 is an enlarged view of the Z-bend part of the duct blank shown in FIG. 7.
Figure 9:
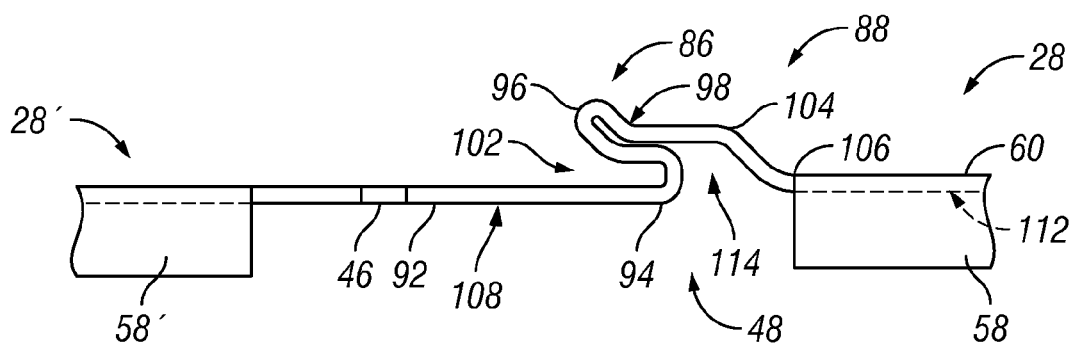
FIG. 9 is an end view of the Z-bend shown in FIG. 9.

Referring specifically to FIGS. 8 and 9, the Z-bend has a first inward fold 94 adjacent to the leg part and has a first outward fold 96 disposed inward of the inward fold. Between the inward and outward folds, a second inward fold 98 forms an insertion angle 102 opening toward the trailing end of the duct blank.

The offset part has an outward bend 104 and an inward bend 106. The outward and inward bends together bring the outer surface 108 of the leg part into substantial alignment with the outer surface 112 of the duct blank. The outward bend and the inward bend are spaced apart so as to form a gap 114 between the Z-bend inward fold and the duct blank main part.

Figure 10:
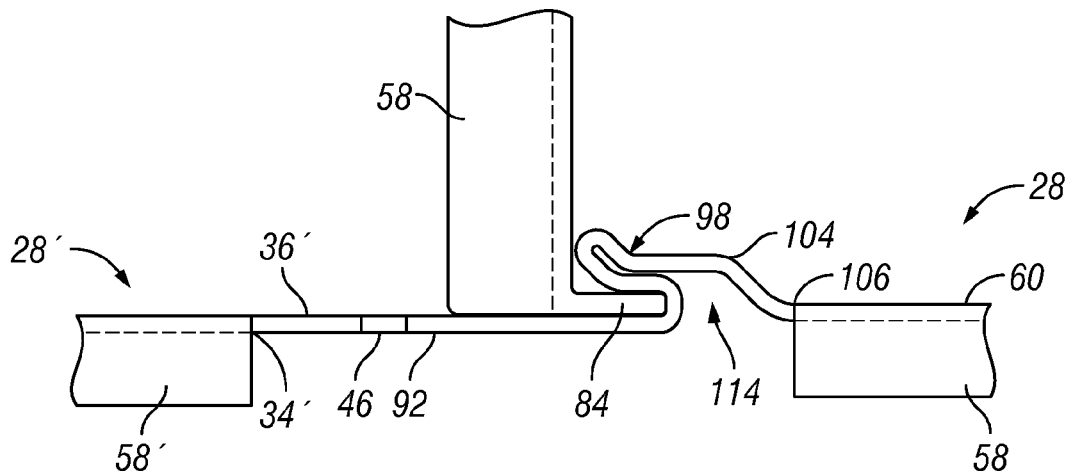
FIG. 10 is an enlarged end view of the Z-bend shown in FIG. 9, with the lock tab inserted into the Z-bend.

Referring to FIGS. 9 and 10, in the forming apparatus, the duct blank is folded at the intermediate notches so that the lock tab is inserted into the Z-bend adjacent to the leg part. The insertion angle is proportioned to receive and guide the lock tab into the Z-bend.

Figure 11:
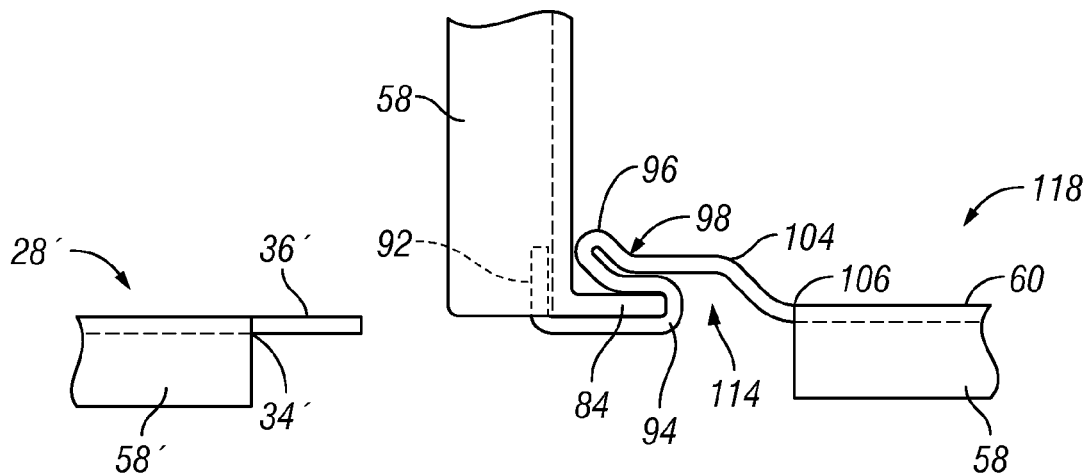
FIG. 11 is an enlarged end view of a duct portion formed from the duct blank shown in FIGS. 8-13.

Referring to FIG. 11, after the lock tab has been inserted into the Z-bend by operation of the forming apparatus, the wiper then is pivoted upward to form an approximately twenty (20) degree lock bend 116 in the leg part adjacent to the duct blank male portion. Referring back to FIG. 6, the duct blank then is advanced so that the duct blank trailing end is in registration with the shear blades, and the retractable rib is extended from the wiper to engage the gap between the Z-bend and the duct blank main part. Thus, the duct blank is held with the trailing end and the opposed inward slots registered to the shear blades.

The wiper then is moved against the clamp beam so that the shear blades sever the duct blank from the metal sheet at the trailing end defined by the opposed inward slots. While the retractable rib continues to engage the Z-bend gap, the retractable roller assembly then is extended and moved across the wiper so as to clench the leg part over the main part adjacent to the lock tab, thereby securing the lock tab into the Z-bend to form a finished duct portion 118. Once the leg part has been clenched, the retractable rib is withdrawn from the gap, releasing the finished duct portion.

As a particular advantage of the present invention, the insertion angle enables automated insertion of the lock tab into the female portion with improved reliability. The offset part enhances ease of closure of the lock seam by providing a substantially smooth outer surface that enhances uniformity of a bending force exerted on the leg part through the female portion. Additionally, the offset part enables forming the insertion angle while maintaining a substantially smooth outer surface of the duct blank near the finished lock seam. Also, the offset allows for engagement of a holding bar or clench die with the outer surface of the duct blank female portion. Engagement of a clench die permits clenching shut the lock seam, thereby providing a substantially smoother duct portion than can be obtained with a rolled lock seam. Thus, while the duct blank is held in the forming apparatus, the leg part can be bent to a position substantially flat against the outer surface, providing an attractive smooth appearance to the duct portion. As the leg part already has been bent to lock the seam, the duct portion can be handled for removal from the apparatus without concern for the male portion springing out from the female portion of the seam.

Although this invention has been shown and described with respect to the detailed embodiments thereof, it will be understood by those skilled in the art that various changes in form and detail thereof may be made without departing from the spirit and the scope of the invention.

What is claimed is:

1. An apparatus for in-line manufacturing of sheet metal duct portions from a metal sheet, comprising:

means for notching the metal sheet to define a duct blank body having a pair of opposed lateral edges and having a plurality of opposed notches indented at predetermined intervals into the opposed lateral edges; and a forming apparatus for bending said duct blank body at said plurality of opposed notches so as to form a duct having dimensions defined by said predetermined intervals, and having male and female portions, the female portion including a Z-bend having a leg part, the forming apparatus including a bed assembly, a clamp beam vertically movable relative to the bed assembly, and a wiper pivotally and vertically movable relative to the bed assembly and the clamp beam, the wiper including a clench tool mechanism for clenching said female portion around said male portion so as to close said duct, the means for notching and the forming apparatus being disposed in-line to define an apparatus mid-line; and wherein said clench tool mechanism further includes a retractable rib pivotally movable from a position housed within said wiper to a position protruding above an upper working surface of said wiper, said retractable rib being moved into locking engagement with said Z-bend when said male portion is inserted into said Z-bend.

2. The apparatus according to claim 1, further comprising: means for bending said duct blank body to form flanges extending along said opposed lateral edges substantially perpendicular to a main part of said duct blank body.

3. The apparatus according to claim 2, wherein said clench tool mechanism includes a retractable roller assembly pivotally movable from a position recessed within said wiper to a position extended above said wiper upper working surface, said retractable roller assembly and said retractable rib being disposed so as to define a space therebetween for receiving said female portion Z-bend, said retractable roller assembly being laterally movable across said wiper substantially parallel to said retractable rib so as to clench said female portion Z-bend leg part against said male portion, thereby closing said duct.

4. The apparatus according to claim 3, said means for notching being disposed in-line between said means for bending and said forming apparatus.

5. The apparatus according to claim 2, said means for notching being disposed in-line between said means for bending and said forming apparatus.

6. The apparatus according to claim 1, said means for notching including main notchers and intermediate notchers.

7. The apparatus according to claim 6, each of said main notchers including a die and punch combination, the die defining an opening having lead and trail edges, an inward edge, and a slot extending further inward from the inward edge, said main notchers being disposed in pairs mutually offset from said apparatus mid-line, each of the dies being arranged with the inward edge parallel to said mid-line and the slot extending toward said mid-line.

8. The apparatus according to claim 6, said main notchers being disposed in-line between said intermediate notchers and said forming apparatus.

* * * * *